(12) United States Patent
Gordon et al.

(10) Patent No.: US 8,732,835 B2
(45) Date of Patent: *May 20, 2014

(54) SYSTEM, METHOD, AND COMPUTER PROGRAM PRODUCT FOR INTERFACING A PLURALITY OF RELATED APPLICATIONS

(75) Inventors: Bryson P. Gordon, Campbell, CA (US); Ryan L. Schneider, Oakwood, OH (US)

(73) Assignee: McAfee, Inc., Santa Clara, CA (US)

( * ) Notice: Subject to any disclaimer, the term of this patent is extended or adjusted under 35 U.S.C. 154(b) by 1156 days.

This patent is subject to a terminal disclaimer.

(21) Appl. No.: 11/855,072

(22) Filed: Sep. 13, 2007

(65) Prior Publication Data

US 2013/0275999 A1 Oct. 17, 2013

Related U.S. Application Data

(63) Continuation of application No. 10/318,559, filed on Dec. 12, 2002.

(51) Int. Cl.
*G06F 11/00* (2006.01)
(52) U.S. Cl.
USPC .................. 726/24; 713/188; 726/22; 726/23
(58) Field of Classification Search
USPC ............................ 726/11, 23, 24, 26; 713/188
See application file for complete search history.

(56) References Cited

U.S. PATENT DOCUMENTS

| | | | |
|---|---|---|---|
| 5,333,256 A | 7/1994 | Green et al. | |
| 5,657,460 A | 8/1997 | Egan et al. | |
| 5,870,543 A | 2/1999 | Ronning | |
| 5,956,481 A | 9/1999 | Walsh et al. | |
| 5,991,881 A | 11/1999 | Conklin et al. | |
| 6,088,804 A | 7/2000 | Hill et al. | |
| 6,205,552 B1 | 3/2001 | Fudge | |
| 6,266,774 B1 | 7/2001 | Sampath et al. | |
| 6,269,456 B1 | 7/2001 | Hodges et al. | |
| 6,282,709 B1 | 8/2001 | Reha et al. | |
| 6,298,445 B1 | 10/2001 | Shostack et al. | |
| 6,304,975 B1 | 10/2001 | Shipley | |
| 6,327,594 B1 | 12/2001 | Van Huben et al. | |
| 6,357,008 B1 | 3/2002 | Nachenberg | |
| 6,493,871 B1 | 12/2002 | McGuire et al. | |
| 6,535,227 B1 | 3/2003 | Fox et al. | |
| 6,553,378 B1 | 4/2003 | Eschelbeck | |
| 6,567,808 B1 | 5/2003 | Eschelbeck et al. | |
| 6,704,874 B1 | 3/2004 | Porras et al. | |
| 6,711,615 B2 | 3/2004 | Porras et al. | |
| 6,715,083 B1 | 3/2004 | Tovander | |
| 6,785,732 B1 | 8/2004 | Bates et al. | |
| 6,871,214 B2 | 3/2005 | Parsons et al. | |
| 6,898,715 B1 * | 5/2005 | Smithson et al. ............... | 726/24 |

(Continued)

OTHER PUBLICATIONS

Office Action Summary from U.S. Appl. No. 10/318,559 mailed on Apr. 24, 2009.

(Continued)

*Primary Examiner* — Christopher Brown
(74) *Attorney, Agent, or Firm* — Wong, Cabello, Lutsch, Rutherford & Brucculeri, LLP (57) ABSTRACT

A system, method and computer program product are provided for interlacing a plurality of applications. Initially, a signal is received at an interface indicating that a first application has responded to an event with a first response. The interface, in turn, prompts a second response to the event by a second application.

14 Claims, 9 Drawing Sheets

(56) References Cited

U.S. PATENT DOCUMENTS

| | | | |
|---|---|---|---|
| 6,941,467 B2 | 9/2005 | Judge et al. | |
| 6,948,169 B1 | 9/2005 | Amro et al. | |
| 6,952,779 B1 | 10/2005 | Cohen et al. | |
| 6,966,059 B1 | 11/2005 | Shetty et al. | |
| 6,976,251 B2 | 12/2005 | Meyerson | |
| 6,980,927 B2 | 12/2005 | Tracy et al. | |
| 7,007,301 B2 | 2/2006 | Crosbie et al. | |
| 7,010,696 B1 | 3/2006 | Cambridge et al. | |
| 7,080,000 B1 | 7/2006 | Cambridge | |
| 7,096,215 B2 | 8/2006 | Bates et al. | |
| 7,114,183 B1 | 9/2006 | Joiner | |
| 7,127,743 B1 | 10/2006 | Khanolkar et al. | |
| 7,134,141 B2 | 11/2006 | Crosbie et al. | |
| 7,137,145 B2 | 11/2006 | Gleichauf | |
| 7,174,566 B2 | 2/2007 | Yadav | |
| 7,181,519 B2 | 2/2007 | Pillai et al. | |
| 7,305,709 B1 | 12/2007 | Lymer et al. | |
| 7,353,229 B2 | 4/2008 | Vilcauskas et al. | |
| 7,434,177 B1 | 10/2008 | Ording et al. | |
| 7,444,679 B2 | 10/2008 | Tarquini et al. | |
| 7,555,776 B1 | 6/2009 | Lymer et al. | |
| 7,606,821 B2 | 10/2009 | Leahy et al. | |
| 7,624,450 B1 | 11/2009 | Lymer et al. | |
| 7,640,434 B2 | 12/2009 | Lee et al. | |
| 7,882,193 B1 * | 2/2011 | Aronson et al. | 709/207 |
| 7,921,459 B2 | 4/2011 | Houston et al. | |
| 2002/0046299 A1 | 4/2002 | Lefeber et al. | |
| 2002/0059095 A1 | 5/2002 | Cook | |
| 2002/0078382 A1 | 6/2002 | Sheikh et al. | |
| 2002/0133522 A1 | 9/2002 | Greetham et al. | |
| 2002/0147803 A1 | 10/2002 | Dodd et al. | |
| 2002/0171546 A1 * | 11/2002 | Evans et al. | 340/540 |
| 2003/0084322 A1 | 5/2003 | Schertz et al. | |
| 2003/0084340 A1 | 5/2003 | Schertz et al. | |
| 2003/0120733 A1 | 6/2003 | Forman | |
| 2003/0135749 A1 | 7/2003 | Gales et al. | |
| 2003/0154269 A1 | 8/2003 | Nyanchama et al. | |
| 2003/0191966 A1 * | 10/2003 | Gleichauf | 713/201 |
| 2003/0208687 A1 | 11/2003 | Liang et al. | |
| 2004/0006704 A1 | 1/2004 | Dahlstrom et al. | |
| 2004/0015719 A1 | 1/2004 | Lee et al. | |
| 2004/0064722 A1 | 4/2004 | Neelay et al. | |
| 2004/0078580 A1 * | 4/2004 | Hsu et al. | 713/188 |
| 2004/0083474 A1 | 4/2004 | McKinlay et al. | |
| 2004/0181685 A1 | 9/2004 | Marwaha | |
| 2004/0225877 A1 | 11/2004 | Huang | |
| 2004/0250133 A1 | 12/2004 | Lim | |
| 2005/0010649 A1 | 1/2005 | Payne et al. | |
| 2006/0080735 A1 | 4/2006 | Brinson et al. | |
| 2006/0129947 A1 | 6/2006 | Hamzy et al. | |
| 2007/0273499 A1 | 11/2007 | Chlubek et al. | |

OTHER PUBLICATIONS

News Release "Symantec to Support New Version of Virus Scanning API for Microsoft Exchange 2000" Jun. 25, 2001.
Norton Anti Virus 2002 Users Guide (2001).
Norton Internet Security Professional 2002 User's Guide (2001).
Norton Internet Security Professional 2003 User's Guide (2002).
Final Office Action Summary from U.S. Appl. No. 10/318,559 mailed on Nov. 12, 2009.
US Application for "Combined Multiple-Application Alert System and Method," U.S. Appl. No. 10/318,693.
US Application for "System, Method and Computer Program Product for Managing a Plurality of Applications via a Single Interface" U.S. Appl. No. 10/319,288.
US Application for "System, Method, and Computer Program Product for Conveying a Status of a Plurality of Security Applications," U.S. Appl. No. 10/325,170.
Office Action dated Dec. 14, 2010, U.S. Appl. No. 12/324,325.
Office Action dated May 14, 2010, U.S. Appl. No. 11/855,109.
Final Office Action dated Nov. 3, 2010, U.S. Appl. No. 11/855,109.
Advisory Action dated Jan. 29, 2010, U.S. Appl. No. 10/318,559.
Advisory Action dated Mar. 30, 2007, U.S. Appl. No. 10/318,559.
Final Office Action dated Jan. 11, 2007, U.S. Appl. No. 10/318,599.
Final Office Action dated Feb. 25, 2008, U.S. Appl. No. 10/318,559.
Final Office Action dated Nov. 12, 2009, U.S. Appl. No. 10/318,559.
Office Action dated Jun. 21, 2006, U.S. Appl. No. 10/318,559.
Office Action dated May 16, 2006, U.S. Appl. No. 10/318,559.
Office Action dated Jul. 24, 2007, U.S. Appl. No. 10/318,559.
Office Action dated Jul. 3, 2008, U.S. Appl. No. 10/318,559.
Office Action dated Nov. 10, 2008, U.S. Appl. No. 10/318,559.
Office Action dated Apr. 24, 2009, U.S. Appl. No. 10/318,559.
Office Action dated Aug. 18, 2010 U.S. Appl. No. 10/318,559.
Office Action dated Aug. 25, 2010, U.S. Appl. No. 11/855,072.
Examiner's Answer dated Apr. 17, 2008, U.S. Appl. No. 10/318,693.
Final Office Action dated May 30, 2007, U.S. Appl. No. 10/318,693.
Final Office Action dated Oct. 5, 2006, U.S. Appl. No. 10/318,693.
Office Action dated May 8, 2006, U.S. Appl. No. 10/318,693.
Office Action dated Dec. 21, 2006, U.S. Appl. No. 10/318,693.
Advisory Action dated Feb. 14, 2007, U.S. Appl. No. 10/319,288.
Final Office Action dated Sep. 17, 2009, U.S. Appl. No. 10/319,288.
Final Office Action dated Nov. 1, 2006, U.S. Appl. No. 10/319,288.
Final Office Action dated Nov. 28, 2007 U.S. Appl. No. 10/319,288.
Office Action dated Feb. 5, 2009, U.S. Appl. No. 10/319,288.
Office Action dated Apr. 18, 2006, U.S. Appl. No. 10/319,288.
Office Action dated Jun. 14, 2007, U.S. Appl. No. 10/319,288.
Office Action dated Jul. 22, 2010, U.S. Appl. No. 11/855,941 U.S. Appl. No. 10/319,288.
Examiner's Answer dated Oct. 29, 2009, U.S. Appl. No. 10/325,025.
Final Office Action dated Dec. 2, 2008 U.S. Appl. No. 10/325,025.
Final Office Action dated Jan. 29, 2007, U.S. Appl. No. 10/325,025.
Office Action dated May 16, 2008, U.S. Appl. No. 10/325,025.
Office Action dated Jun. 22, 2006, U.S. Appl. No. 10/325,025.
Office Action dated Oct. 17, 2007, U.S. Appl. No. 10/325,025.
Office Action dated Sep. 9, 2010 U.S. Appl. No. 10/325,025.
Notice of Allowance dated Feb. 5, 2007, U.S. Appl. No. 10/325,170.
Office Action dated Jul. 5, 2006, U.S. Appl. No. 10/325,170.
Notice of Allowance dated Jul. 29, 2009 U.S. Appl. No. 11/735,877.
Office Action dated Dec. 24, 2008, U.S. Appl. No. 11/735,877.
Notice of Allowance dated Feb. 24, 2009, U.S. Appl. No. 11/855,953.
Office Action dated Aug. 18, 2008, U.S. Appl. No. 11/855,953.
News Release "Symantec to Support New Version of Virus Scanning API for Microsoft Exchange 2000" Jun. 25, 2001, Cupertino, CA, retrieved from http://www.symantec.com/press/2001/n010625a.html on Feb. 8, 2011.
Phillips, et al. "A Graph-Based System for Network Vulnerability Analysis" ACM, 1999 pp. 71-79.
Dale Farris, "Ontrack SystemSuite 3.0," obtained from http://web.archive.org/web/20010427043719/http://www.gtpcc.org/gtpcc/systemsuite.htm generated on Feb. 2, 2011, 9 pages.
"Norton AntiVirus Corporate Edition User's Guide," EIC 2100, Copyright © 1999, 2000 Symantec Corporation, Documentation Version 7.5, 37 pages.
"Norton AntiVirus User's Guide: Norton AntiVirus 2002," Copyright © 2001 Symantec Corporation, Documentation version 8.0, PN: 07-30-00469, 90 pages.
"Norton Internet Security 2003: User's Guide," Copyright © 2002 Symantec Corporation, Documentation version 6.0, PN: 10024898, 255 pages.
"Norton Internet Security Professional User's Guide: Norton Internet Security 2002 Profession Edition," Copyright © 2001, Symantec Corporation, Documentation version 1.0, PN: 07-30-00481, 253 pages.
"Norton Internet Security User's Guide: Norton Internet Security 2001," Copyright © 1995-2000 Symantec Corporation, Documentation version 2.5, PN: 07-30-00432, 61 pages.

* cited by examiner

| Smart Security Event Correlation Center (SecurityCenter) ||
|---|---|
| Event Registration (production) | Event Broadcasting (consumption) |
| VirusScan (VS) ||
| New Infected File | • Add the infected app to the Blocked Internet Application list (PF)<br>• Send MD5 hash to Hackerwatch (PF) |
| Email Virus Detected | • Generate always block text/attachment filter (SK) |
| ActiveShield disabled | • Lockdown Internet access (PF) |
| Infected File Quarantined ||
| Infected File Cleaned ||
| Email Virus Cleaned ||
| Running on demand scan | • Clean temporary files directory (QC) |
| HAWK detects potential mass mailer ||
| Firewall (PF) ||
| Inbound Packet Blocked ||
| New Application Granted Internet Access ||
| New Application denied Internet Access ||
| New IP address Banned | • Add IP to always block list (PS) |
| New IP address Trusted | • Add IP to always allow list (PS) |
| Trojan application blocked from attempted Internet access | • Force DAT update (VS)<br>• Run on-demand scan (VS)<br>• Change PII settings to always block (PS) |
| Security Level Changed ||
| Trace IP ||
| SpamKiller (SK) ||
| New blocked email ||
| New potential mass worm | • Force DAT update (VS) |
| Friend added to white list ||
| IP added to always block list ||
| IP added to friends list ||
| Message rescued ||
| Privacy Service (PS) ||
| IM conversation blocked | • Add IP to always block list (SK)<br>• Mark messages for reporting (SK)<br>• Ban an IP (PF)<br>• Trace IP (PF)<br>• Report statistics to SecurityCenter (SK, PF) |
| Web page blocked ||
| P2P content blocked ||
| PII intercepted and blocked ||
| IP added to always allow ||
| IP added to always block ||

SYSTEM, METHOD, AND COMPUTER PROGRAM PRODUCT FOR INTERFACING A PLURALITY OF RELATED APPLICATIONS

RELATED APPLICATIONS

The present application is a continuation of application Ser. No. 10/318,559 filed on Dec. 12, 2002, which is incorporated herein by reference.

FIELD OF THE INVENTION

The present invention relates to application management, and more particularly to the interaction of a plurality of applications.

BACKGROUND OF THE INVENTION

Security threats have evolved significantly over the past years. Advanced hybrid threats, have been designed to attack systems on multiple fronts, sometimes searching for vulnerabilities until one is found. New threats also attempt to attack security technology itself.

Traditional consumer security software suites often included a plurality of various applications such as an anti-virus application, a firewall application, etc. These applications existed in such software suites as a simple bundle. In other words, each application secures a particular domain in a vacuum. As such, the anti-virus application may do a stringent scans, but the firewall application may not take any action at all, and so on.

All security applications perform actions. Some of these actions are trivial and some are more sophisticated. More importantly, other security applications may benefit from being informed as to when these actions occur. For example, when an anti-virus application detects and cleans a virus, it may be beneficial for other installed security applications to respond in kind.

Figure 1:
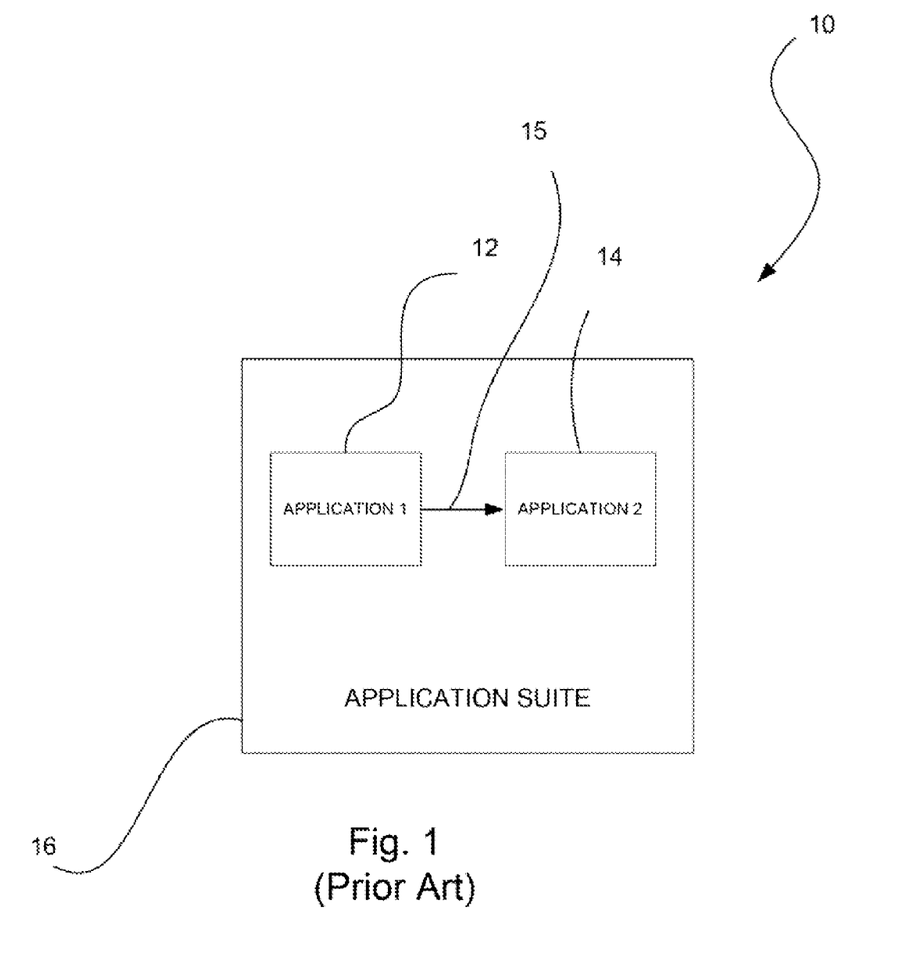
FIG. 1 illustrates one exemplary prior art system.

Prior Art FIG. 1 illustrates one exemplary prior art system 10 where one application may interact with another. As shown, a first application 12 and a second application 14 are included in an application suite 16. In such prior art system 10, the first application 12 is equipped with a specific command 15 (i.e. execute operation X, etc.) that may be directly transmitted to the second application 14 to prompt a response from the second application 14.

Unfortunately, such prior art system 10 is overly simplistic and ineffective in enabling communications across a larger number of applications. There is simply no current technique of accomplishing effective cross-application communication. There is thus a need for an effective technique of granting security applications the ability to communicate with each other.

DISCLOSURE OF THE INVENTION

A system, method and computer program product are provided for interfacing a plurality of applications. Initially, a signal is received at an interface indicating that a first application has responded to an event with a first response. The interface, in turn, prompts a second response to the event by a second application.

In one embodiment, the interface may include an application program interface. Moreover, the first application and the second application may include an anti-virus application, a firewall application, a content filtering application, an anti-spam application, and/or a utilities application.

In another embodiment, the first response may be identified in a first library utilizing the interface. Such first library may be a component of the first application. Further, the first library may be installed with the first application. Still yet, the first response may be correlated with the second response in a second library utilizing the interface. Similar to the first library, the second library may be a component of the second application. Further, the second library may be installed with the second application. Logic of the interface may be utilized for the correlating.

Thus, in another embodiment, an additional application may be installed. Thus, at least one additional library associated with the additional application may be registered. In use, the logic may be adapted for interfacing the additional application with the first application and the second application using the libraries in the foregoing manner.

Thus, a plurality of data structures is provided for interfacing a plurality of applications. Such data structures may each include a library with a plurality of production events and a plurality of consumption events associated with a particular application.

In still yet another embodiment, a user may be alerted of the event. A first portion of the alert may relate to the first application. Similarly, a second portion of the alert may relate to the second application. Specifically, the first portion of the alert may relate to the first response of the first application and the second portion of the alert may relate to the second response of the second application. Optionally, the first portion and the second portion of the alert may be displayed to the user simultaneously via a single alert.

In another embodiment; the interface may farther include a graphical user interface for allowing access to the first application and the second application. Such graphical user interface may further be used for indicating a status of the first application and the second application.

BRIEF DESCRIPTION OF THE DRAWINGS

Prior Art

FIG. 6 illustrates an exemplary manner in which production and consumption events are correlated according to the method of FIG. 5 and in the context of the libraries of FIG. 4.

DESCRIPTION OF THE PREFERRED EMBODIMENTS

Figure 1A:
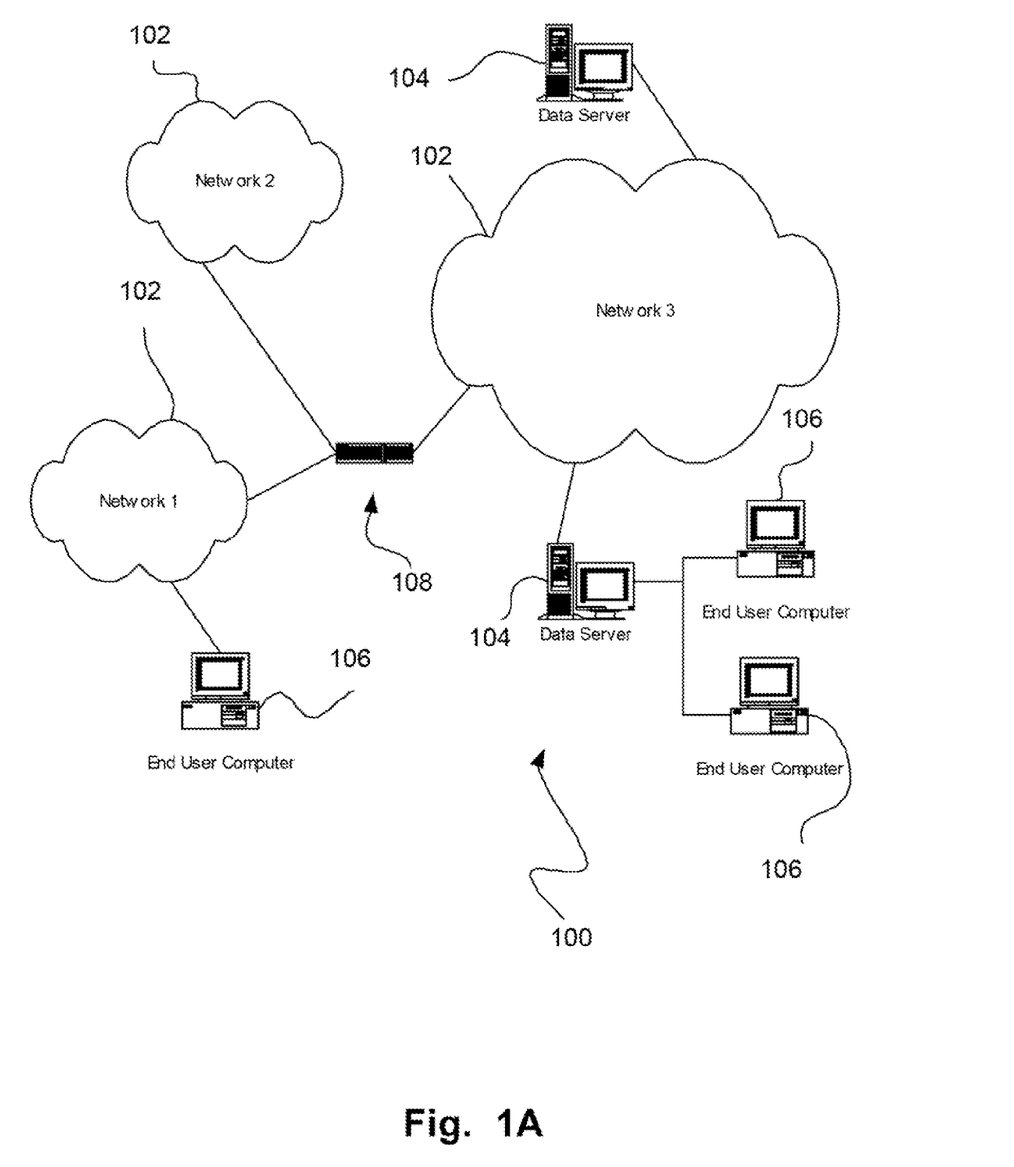
FIG. 1A illustrates a network; architecture, in accordance with one embodiment.

FIG. 1A illustrates a network architecture 100, in accordance with one embodiment. As shown, a plurality of networks 102 is provided. In the context of the present network architecture 100, the networks 102 may each take any form including, but not limited to a local area network (LAN), a wide area network (WAN) such as the Internet, etc.

Coupled to the networks 102 are data server computers 104 which are capable of communicating over the networks 102. Also coupled to the networks 102 and the data server computers 104 is a plurality of end user computers 106. In order to facilitate communication among the networks 102, at least one gateway or router 108 is optionally coupled therebetween. It should be noted that each of the foregoing network devices as well as any other unillustrated devices may be interconnected by way of a plurality of network segments.

Figure 2:
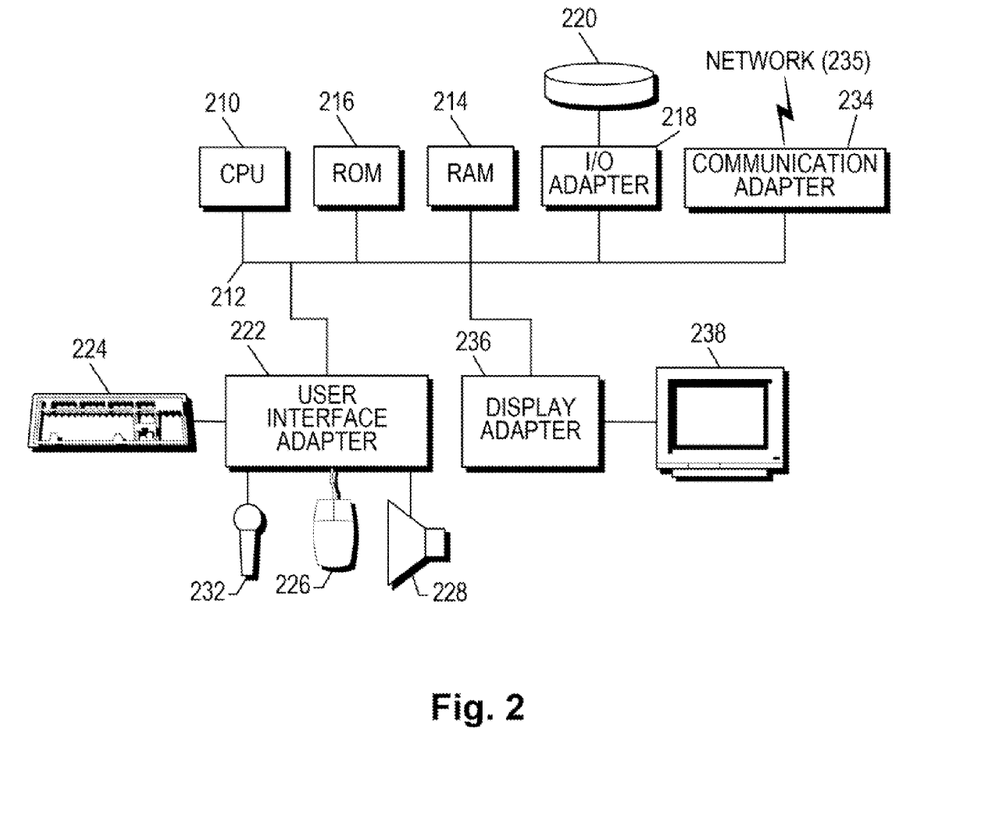
FIG. 2 shows a representative hardware environment that may be associated with the data server computers and/or end user computers of FIG. 1A, in accordance with one embodiment.

FIG. 2 shows a representative hardware environment that may be associated with the data server computers 104 and/or end user computers 106 of FIG. 1A, in accordance with one embodiment. Such figure illustrates a typical hardware configuration of a workstation in accordance with a preferred embodiment having a central processing unit 210, such as a microprocessor, and a number of other units interconnected via a system bus 212.

The workstation shown in FIG. 2 includes a Random Access Memory (RAM) 214, Read Only Memory (ROM) 216, an I/O adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows NT or Windows/95 Operating System (OS), the IBM OS/2 operating system, the MAC OS, or UNIX operating system. It will be appreciated that a preferred embodiment may also be implemented on platforms and operating systems other than those mentioned. A preferred embodiment may be written using JAVA, C, and/or C++ language, or other programming languages, along with an object oriented programming methodology. Object oriented programming (OOP) has become increasingly used to develop complex applications.

Our course, the various embodiments set forth herein may be implemented utilizing hardware, software, or any desired combination thereof. For that matter, any type of logic may be utilized which is capable of implementing the various functionality set forth herein.

Figure 3:
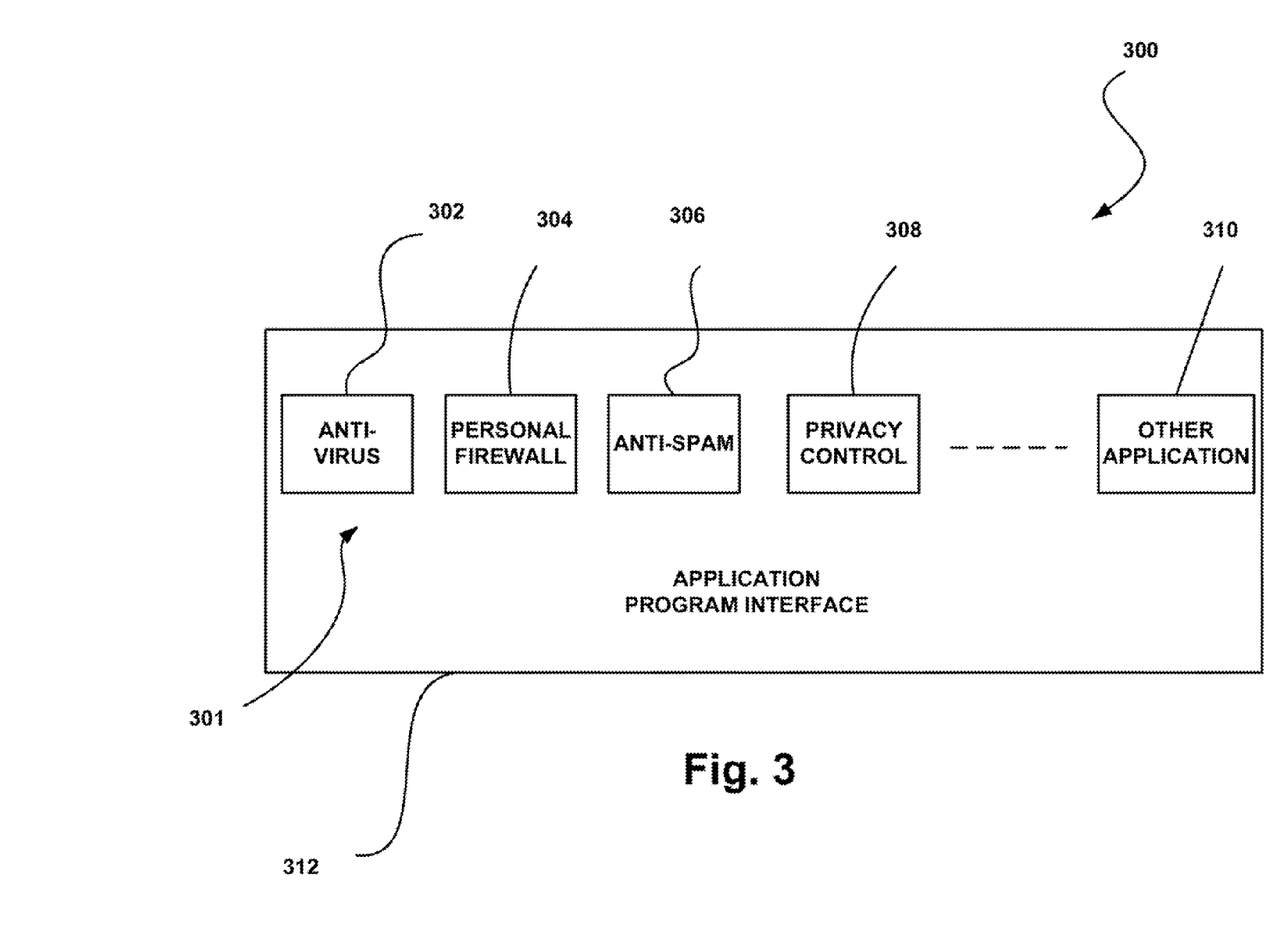
FIG. 3 illustrates a system adapted for interfacing a plurality of applications, in accordance with one embodiment.

FIG. 3 illustrates a system 300 adapted for interfacing a plurality of applications, in accordance with one embodiment. As an option, the present system 300 may be implemented in the context of the architecture of FIGS. 1 and 2. Of course, the system 300 may be implemented in any desired context.

As shown, included is a plurality of applications 301. In the context of the present description, such applications 301 may include any type of application program or computer code. For example, the applications 301 may optionally be security related. Of course, the applications 301 may be related to any other aspects such as business, maintenance, entertainment, etc.

In the security context, the applications 301 may include an anti-virus application 302, a firewall application 304, a content filtering application 308, an anti-spam application 306, and/or any other related application 310 (i.e. a utilities application, etc.).

In use, the anti-virus application 302 may be capable of scanning for viruses or other malicious code by comparing virus signature files with data located in memory or being transmitted via a network; and taking any appropriate response (i.e. quarantine data, delete data, clean data, alert user, etc.). Moreover, the firewall application 304 may be capable of blocking or alerting a user of accesses to a computer or network based on a predetermined set of rules or policies.

Still yet, the content filtering application 308 may be capable of protecting personal information on a computer and preventing the same from being shared. Still yet, the content filtering application 308 may be capable of preventing certain users from accessing predetermined content on a network such as the internet. Moreover, the anti-spam application 306 may be capable of filtering electronic mail messages based on a predetermined rule set to prevent the receipt (or delivery) of unwanted e-mail.

It should be noted that each of the applications may be capable of reporting information back to the interface. For example, the firewall application may report hacker attacks in the form of a consumption event. In a similar manner, the anti-spam application may be able to report, spam, viruses, etc.

As mentioned earlier, any other related application 310 may be included in the group of applications 301. For example, a utilities application may be included for executing various maintenance tasks associated with a computer (i.e. cleaning files, optimizing memory, etc.).

Further provided in combination with the applications 301 of the system 300 is an interface 312. In use, such interface 312 may include any specific method, technique or protocol by which an application program can communicate with an operating system or another application. In one embodiment, such interface 312 may include an application program interface.

In use, the interface 312 is capable of receiving a signal that an event has been detected or responded to by a first one of the applications 301. Thereafter, a second one of the applications 301 is prompted to respond to the event utilizing the interface 312.

As an option, the interface 312 may further include a graphical user interface for allowing access to the various applications 301. Such graphical user interface may further be used for indicating a status of the different applications 301.

It should be noted that the foregoing technique may be accomplished in any desired manner. Additional information regarding specific optional features will be set forth in greater detail during reference to the following figures.

Figure 3A:
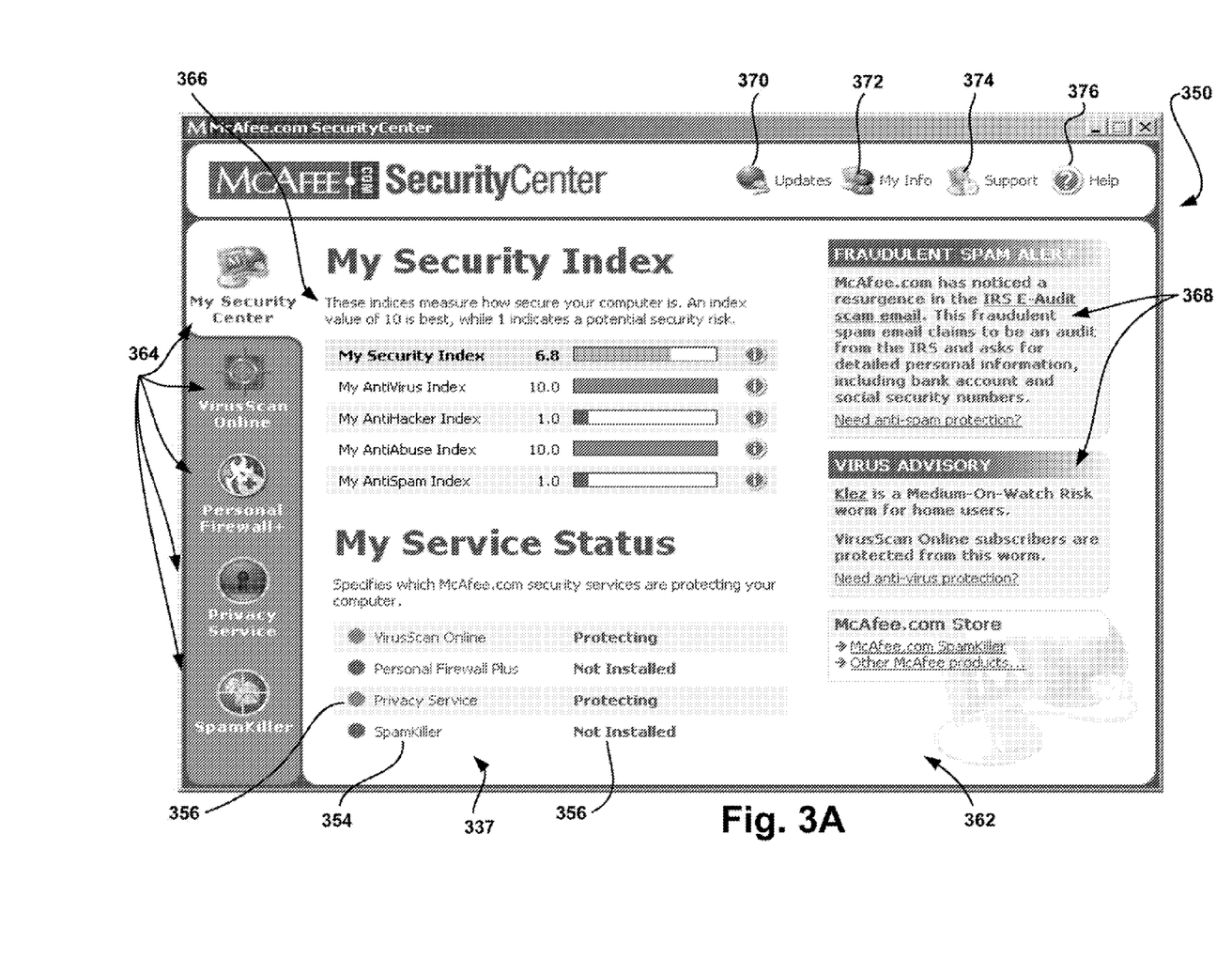
FIG. 3A shows an exemplary graphical user interface associated with the interface of FIG. 3.

FIG. 3A illustrates an exemplary graphical user interface 350 associated with the interface 312 of FIG. 3. To allow access to each of the applications via the single graphical user interface 350, the graphical user interface 350 may include a home page 362 and a plurality of selection icons 364 for allowing access to a plurality of windows (not shown) associated with each of the applications. Optionally, such windows may each include access to functionality associated with the corresponding one of the related applications.

In use, the home page 362 may be adapted for displaying a visual indication as to the status of each of the applications, along with various other information. For example, a security index 366 may be provided for indicating a level of risk associated with various aspects (i.e. security aspects) of a computer or networking environment. Further included is general information and alerts displayed in separate frames 368. As will soon become apparent, such alerts may be pushed from a server and further provide various options to a user. Still yet, the home page 362 may include an update icon 370, additional information icon 372, a support icon 374, and a help icon 376.

To convey the status of each of the applications, the home page 362 of the single graphical user interface 350 may include a list 337 of a plurality of applications 354. Still yet, the single graphical user interface 350 may include a plurality of status indicators 356 adjacent to each of the applications 354 in the list 337.

Each status indicator 356 may indicate whether the corresponding the application is installed. Moreover, each status indicator 356 may indicate whether the corresponding the application is enabled. Still yet, each status indicator 356 may indicate whether a subscription associated with the corresponding the application is expired. While this is shown to be accomplished using text, it should be noted that such status may be conveyed in any desired manner.

As an option, each status indicator 356 may be color coded. For example, an icon may be included as a status indicator 356, as shown. In use, such icon may exhibit a red color to reflect the fact that, an application is not Installed, disabled or expired; and a green color may indicate that the application is installed and running.

Of course, the status indicator 356 may include any combination of textual, graphic, numeric visuals that indicates a status of the applications 354. Moreover, such status may include installed, not installed, expired, enabled, disabled, or any other conceivable state of the applications.

Figure 4:
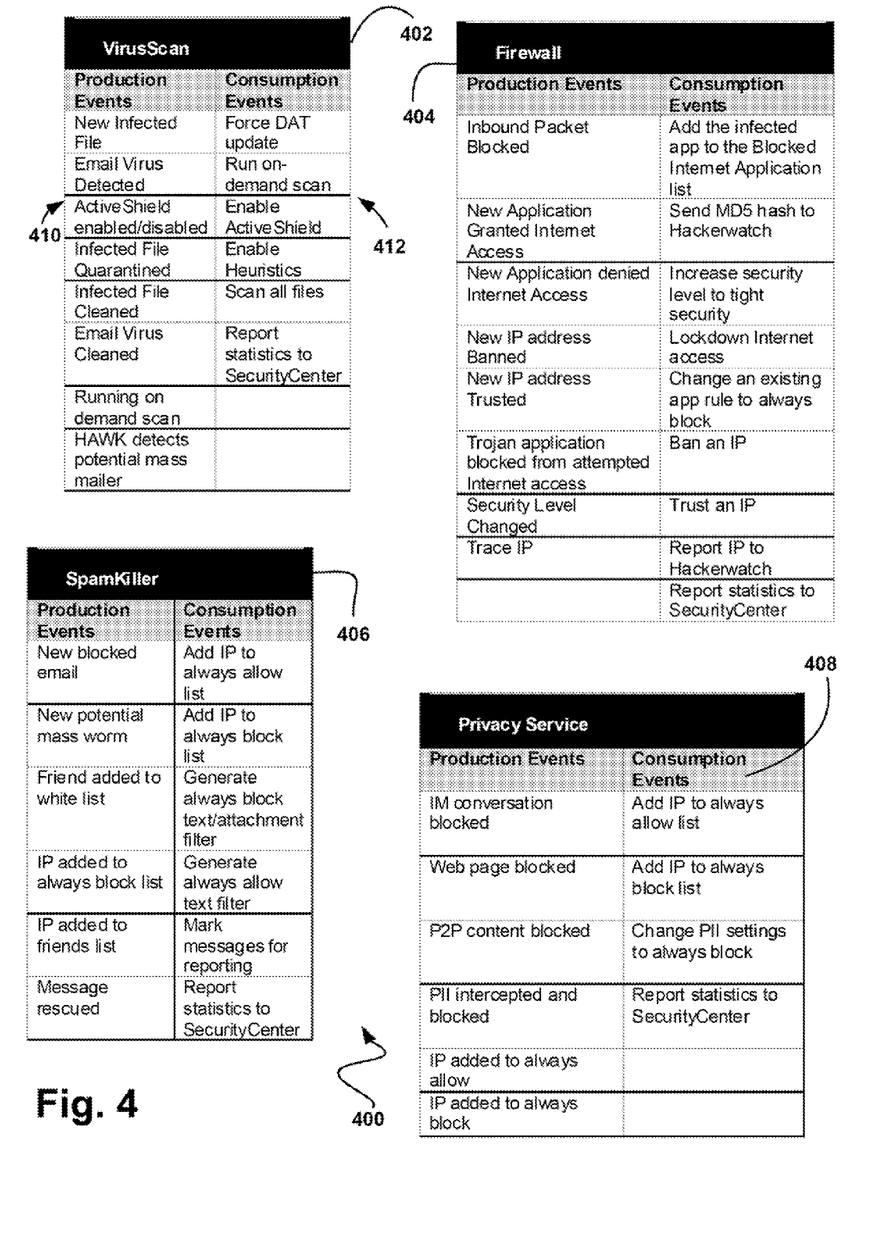
FIG. 4 illustrates a plurality of libraries adapted for facilitating the interfacing of a plurality of applications, in accordance with one embodiment.

FIG. 4 illustrates a plurality of libraries 408 adapted for facilitating the interfacing of a plurality of applications, in accordance with one embodiment. As an option, the libraries 400 may be implemented in the context of the system 300 of FIG. 3. Of course, the libraries 400 may be implemented in any desired context.

As shown, each of a plurality of applications may have a library associated therewith. In the context of FIG. 4, such libraries may include an anti-virus application library 402 associated with an anti-virus application such as that of FIG. 3, a firewall application library 404 associated with a firewall application such as that of FIG. 3, a content filtering application library 408 associated with a content filtering application such as that of FIG. 3, and an anti-spam application library 406 associated with an anti-spam application such as that of FIG. 3.

In particular, each of the libraries 400 may include a list of production events 410 and a plurality of consumption events 412. The production events 410 may include any responses generated by the application associated with the particular library. Still yet, the consumption events 412 may include any responses which the application is capable of receiving from other applications, and responding accordingly. It should be noted that the specific production events 410 and consumption events 412 listed in FIG. 4 are set forth for illustrative purposes only, and should not be construed as limiting in any manner.

In use, each of the libraries 400 may, in one embodiment, be installed on a computer in conjunction with the associated application. Moreover, each of the applications may be installed separately as desired. Of course, per the desires of the user, the libraries 400 may be installed at any time, and the applications may be installed in any combination.

In any case, logic associated with the aforementioned interface may utilize the foregoing libraries 400 to facilitate the appropriate interaction of the applications. More information regarding exemplary details as to the manner in which this is accomplished will be set forth hereinafter in greater detail.

It should be noted that the various events of the libraries 400 may be associated with applications from different companies, thus making the present technique vendor-independent. If an application developer feels that an action taken by their application may be interesting to other applications, the developer may register the action with the logic associated with the interface using the libraries 400. As an option, restrictions may be put into place regarding events that are registered. See, for example, Table 1 which includes a plurality of exemplary restrictions or requirements as to including the production events 410 in the appropriate libraries 400. Of course, such restrictions are strictly optional

TABLE 1

Application can perform an action
The action is non-trivial and results in a "significant change" to the state of the user computer
A message is generated and transmitted to the interface when this action is performed
The feature is supported for the foreseeable future As a further option, certain fields may be included in the libraries 400 for each of the production events 410. See Table 2, for example.

TABLE 2

Product Source
Event Name (i.e. plain English, concise description, etc.)
Event Source (i.e. stateful response, user-action response, etc.)
Event Severity
Event Description (i.e. plain English description which MAY be displayed to end-user, etc.)
Event Parameters (i.e. XML based schema for describing additional information possibly contained in event, etc.)

Table 2A illustrates an exemplary production event associated with an anti-virus application.

TABLE 2A

Product Source: Anti-virus application
Event Name: "Infected File Detected"
Event Source: Stateful Response
Event Severity: High Severity
Event Description: "An anti-virus application has found an infected file on your computer."
Event Parameters: N/A
Filename: Patch of the Infected File
InfectionName: AVERT name of virus/Trojan found
InfectionType: Trojan, Virus, Script-Virus, etc.

Table 3 includes a plurality of exemplary restrictions or requirements as to including consumption events 412 in the appropriate libraries 400. Again, such restrictions are strictly optional.

TABLE 3

The additional functionality augments a consumption event
There is a desire to change internal product settings in response to a consumption event Similar to the production events 410, certain fields may be included in the libraries 400 for each of the consumption events 410. See Table 4, for example.

TABLE 4

Consuming Product
Response Name
Response Description
Response Default Action
Response Additional Actions Table 4A illustrates an exemplary firewall application consumption event associated with the production event set forth in Table 2A.

TABLE 4A

Consuming Product: Firewall application
Response Name: "Infectied Application Blocked"
Response Description: "A firewall application will block the infected file from accessing the Internet and optionally report the file to HackerWatch.org"
Response Default Action: Block
Response Additional Actions: Ignore, Report to HackerWatch.org It should be noted that the libraries 400 may be updated as desired. This may be accomplished utilizing a server-client communication, etc.

Figure 5:
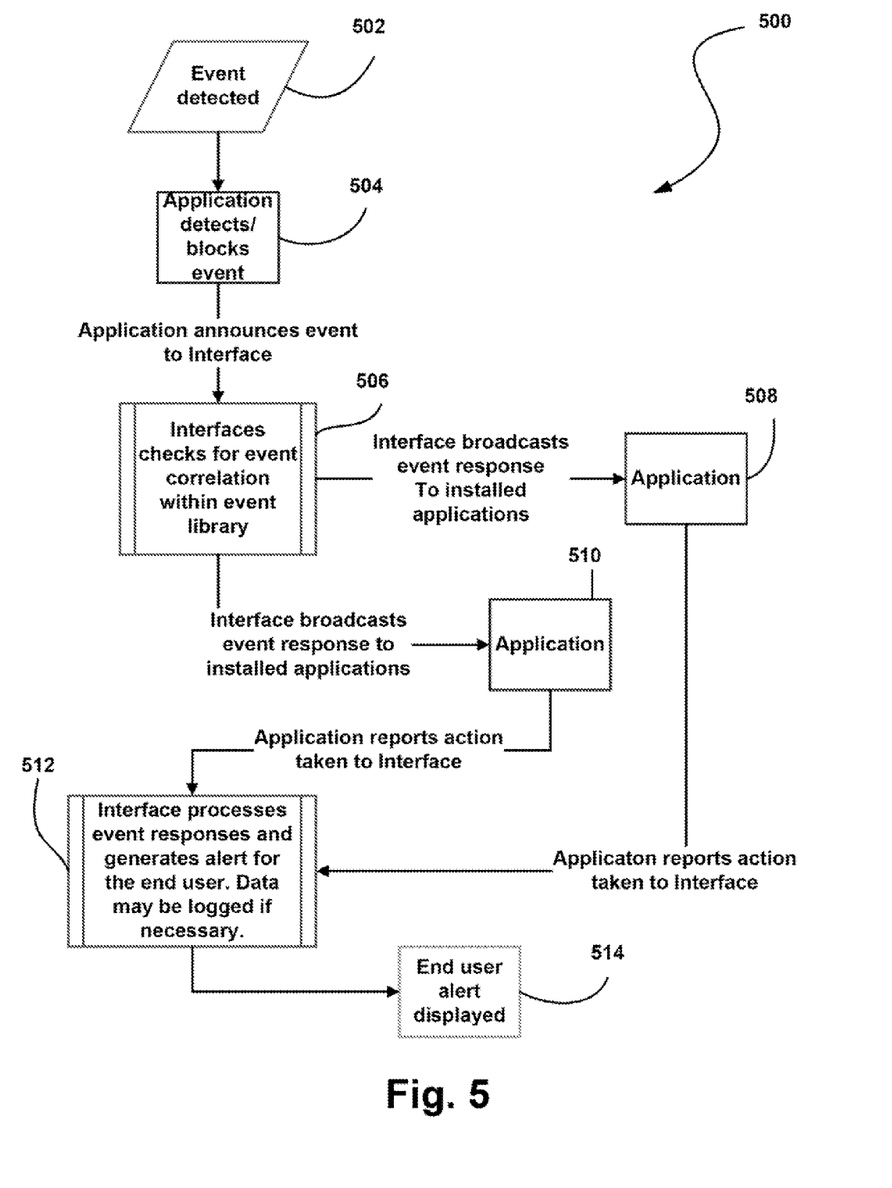
FIG. 5 illustrates a method for interfacing a plurality of applications, in accordance with one embodiment.

FIG. 5 illustrates a method 500 for interfacing a plurality of applications, in accordance with one embodiment. As an option, the method 500 may be implemented in the context of the system and libraries of FIGS. 3 and 4. Of course, the method 500 may be implemented in any desired context.

Initially, an event is detected with a first application. See operation 502. Such event may include any event on a computer or network associated with the application. Moreover, the first application may include any desired application. See, for example, the applications of FIG. 3. In the context of security applications, the event may include a security event. Such security event may include any event associated with the computer or network that may detrimentally affect the same in any manner.

Next, in operation 504, a first response to the event is processed utilizing the first application. Such processing may encompass any objective associated with the particular application. Next, the event and the first response are identified to the interface utilizing the first application. It should be noted that this or any type of signal may be sent to the interface for prompting a response by another application(s).

After such first response is identified in the first library, it is determined whether such production event correlates with a consumption event of another library associated with any other applications. Note operation 506.

If such a correlation is made, the appropriate consumption event or related signal is sent to the application(s). Note, for example, operations 508 and 510. Such actions, in torn, prompt further responses from the other application(s). Of course, such responses may be reported back to the interface for generating additional consumption events, and so on.

It should be noted that the interface may prompt responses from the other application(s) in any desired manner. Just by way of example, the libraries may be used during a registration process to configure the logic governing the interface. Moreover, the logic may be pre-configured and installed with a suite of applications. Of course, any technique capable of prompting responses from the other application(s) may be used.

When all of the appropriate responses have occurred, an alert may be generated in operation 512. Such alerting may be accomplished in any desired manner. For example, the first information may be received relating to the first response to the event associated with the first application. Moreover, second information may be received relating to a second response to the event associated with a second application, and so on. Of course, third and fourth information may be received to reflect the number of applications that have responded to a consumption event in the aforementioned manner.

With this information in hand, a single alert may be displayed including the first information and the second information. Such single alert may further include a window automatically displayed on a front most window of a user interface.

In various embodiments, the information relating to the responses to the event may include any data relevant to such responses. Just by way of example, the information may include a description of the event, which may be included in the single alert. Moreover, the first information may identify a proposed user action relating to the first application based on the event. Similarly, the second information may identify a proposed user action relating to the second application based on die event. Of course, the information may simply describe the automatic responses to the event by the applications. It should be noted that any combination of the foregoing information or any other information may be included per the desires of the user.

Since the amount of information reflected in the single alert may become cumbersome, a ranking may be associated with the first information and the second information. In such embodiment, the single alert may conditionally include the first information and the second information based on the ranking or any other threshold. To this end, only a predetermined amount of information is included in the single alert. Moreover, any type of medium may be employed for transmitting the alert (i.e. Windows® Pop-Up, .NET alert, e-mail, pager, cell phone, etc.

FIG. 6 illustrates an exemplary manner 600 in which production and consumption events are correlated according to the method 500 of FIG. 5 and in the context of the libraries 400 of FIG. 4. It should be noted that such correlation logic is set forth for illustrative purposes only, and should not be construed as limiting in any manner.

As shown, a plurality of production events 602 is shown to be associated with various applications 604. Such production events 602 are, in turn, correlated with various consumption events 606.

As shown, a firewall application may consume a "New Infected File Detected" production event from the anti-virus application, and, as consumption events, automatically add the infected file to a blocked Internet application list and send a hash of the application to a hacker tracking website (i.e. HackerWateh.org). Still yet, the anti-virus application may consume a "Trojan application blocked" production event from the firewall application, and automatically perform a scan of the user's hard drive. Moreover, a content filtering application may consume a "New Internet Protocol Address (IP) Trusted" production event from the firewall application, and automatically add the trusted IP to its trusted site list. Still other examples are set forth in FIG. 6 for illustrative purposes.

Figure 7:
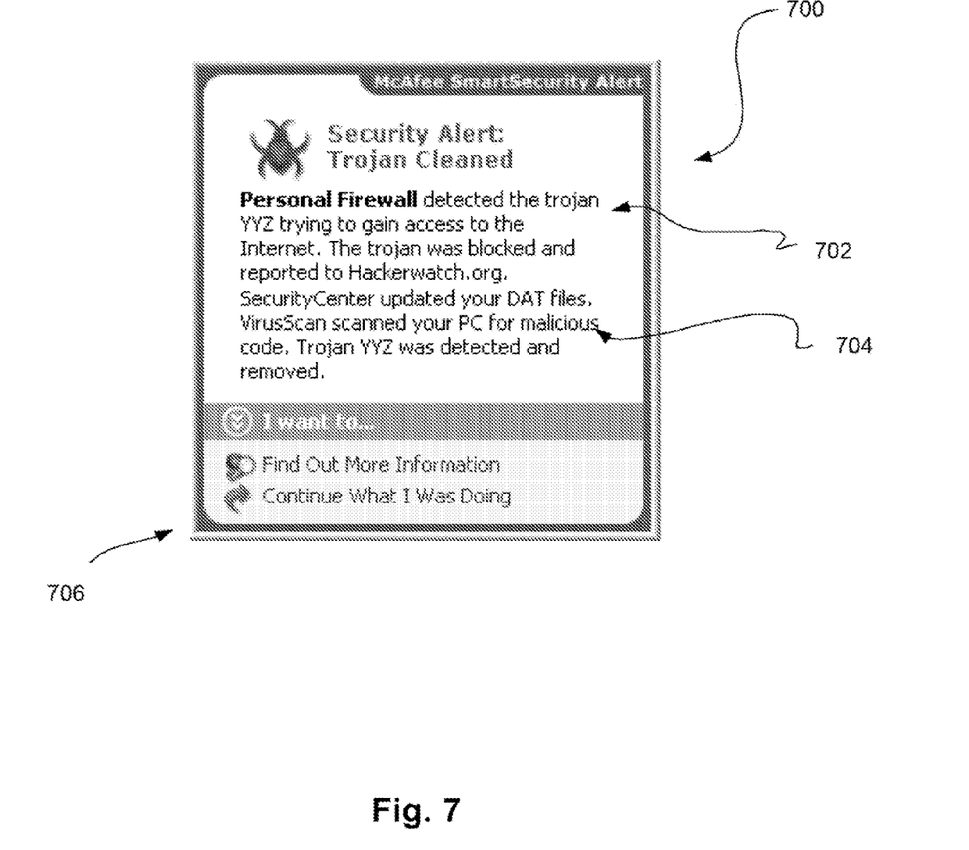
FIG. 7 illustrates an exemplary alert that may be generated according to the method of FIG. 5 and in the context of the libraries and correlation of FIGS. 4 and 6, respectively.

FIG. 7 illustrates an exemplary alert 700 that may be generated according to the method 500 of FIG. 5 and in the context of the libraries 400 and correlation 600 of FIGS. 4 and 6, respectively. It should be noted, of course, that such alert 700 is set forth for illustrative purposes only, and should not be construed as limiting in any manner.

As shown, the alert 700 may include the various information related to the event and the responses to the event by various applications. For example, a first portion 702 of the alert 700 may relate to the first application (i.e. a firewall application). Similarly, a second portion 704 of the alert 700 may relate to the second application (i.e. an anti-virus application). Specifically, the first portion 702 of the alert 700 may relate to the response of the first application and the second portion 704 of the alert 700 may relate to the response of the second application. Optionally, the first portion 702 and the second portion 704 of the alert 700 may be displayed to the user simultaneously via a single alert.

Again, the information included with the alert 700 may include a description of the event, a proposed user action relating to an application based on the event, and/or a description of the response to tire event by an application. It should be noted that any combination of the foregoing information or any other information may be included per the desires of the user.

As an option, the single alert 700 may include a plurality of selection icons 706 capable of being selected by a user for executing at least one of the proposed user actions, if any. Such selection icons may include links (i.e. hyperlinks, etc.) for connecting to a server or the like for carrying out the proposed user actions. As shown in FIG. 7, such actions may include an option to find out more information about the event, launch an application, continuing by doing nothing, etc.

Such response options may be carried out by the selection thereof by a user utilizing a mouse-click or die like. While this may be accomplished in any desired manner, one exemplary method may include the technique set forth in U.S. Pat. No. 6,266,774 entitled "Method and system for securing, managing or optimizing a personal computer," which is incorporated herein by reference in its entirety.

In one embodiment, the single alert 700 may be pushed to a plurality of computers from a server, as opposed to a reaction to an application response on a computer. In the context of the present description, such pushing may include any technique where the server initiates the delivery of the alert 700 to the user computers. It should be noted that the foregoing pushing may be accomplished in a variety of foreseeable ways. Just by way of example, the alert 700 pushed from the server to the user computers may actually come as the result of a programmed request from the user computers. That is, a client program may be used to initiate such pushed alerts 700. Still yet, the pushing may include a simple broadcasting of the alert 700. In this case, the alert 700 may be pushed to the user computers that have access to a particular channel or frequency. Broadcast may (but not always) involve a continuous flow of information.

The foregoing embodiments may thus be useful in a variety of contexts. Just by way of example, if a content filtering application detected someone talking inappropriately to a child, the chat may be blocked and logged. This, in turn, may be reported to the interface which would broadcast this information to the other applications present on the user's computer. An anti-spam application, for example, may obtain the information on the person propositioning the child over instant messenger and ensure that all e-mails from that person are blocked and logged. Personal firewall may, in turn, add the associated IP address to a banned list. Still, yet, a visual trace may then trace the IP to the location of the service provider. As such, the embodiment of the present example may enable the parent to know who, what, when and how information, and would also have all the information available for a report for the authorities.

While various embodiments have been described above, it should be understood that they have been presented by way of example only, and not limitation. For example, any of the network elements may employ any of the desired functionality set forth hereinabove. Thus, die breadth and scope of a preferred embodiment should not be limited by any of the above-described exemplary embodiments, but should be defined only in accordance with the following claims and their equivalents.

What is claimed is:

1. A method for interfacing a plurality of applications via a common interface on a computer system, comprising:
   receiving a signal at a common interface that a first application has detected and responded to an event with a first response, the first response separate from the signal, the common interface configured to allow cross-application communication between the first application and one or more second applications, the one or more second applications different from the first application;
   sending a second signal from the common interface to the one or more second applications, the second signal associated with the first response and prompting for one or more second responses to the event from the one or more second applications;
   receiving at the common interface, an indication of at least one of the one or more second responses to the event from the one or more second applications; and
   generating a single end user alert comprising information concerning the first response and the at least one of the one or more second responses to the event, wherein the single end user alert contains information received at the common interface from both the first application and at least one of the one or more second applications,
   wherein the common interface further includes a graphical user interface for allowing interactive user access to the first application and the one or more second applications, and
   wherein the first application and the one or more second applications include at least one of an anti-virus application, a firewall application, a content filtering application, an anti-spam application, and a utilities application.

2. The method as recited in claim 1, further comprising correlating the first response with the second response utilizing logic of the common interface.

3. A computer program product embodied on a non-transitory computer readable medium to interface a plurality of applications via a common interface on a computer system, comprising computer instructions to cause a programmable processing device to:
   receive a signal at a common interface, the signal indicating that a first application has detected and responded to an event with a first response, the first response separate from the signal, the common interface configured to allow cross-application communication between the first application and one or more second applications, the one or more second applications different from the first application;
   send a second signal from the common interface to the one or more second applications, the second signal associated with the first response and prompting for one or more second responses to the event from the one or more second applications;
   receive via the common interface, an indication of at least one of the one or more second responses to the event from the one or more second applications; and
   generate a single end user alert from the common interface, the single end user alert comprising information concerning the first response and the at least one of the one or more second responses to the event, wherein the single end user alert contains information received at the common interface from both the first application and at least one of the one or more second applications, wherein the common interface further includes a graphical user interface for allowing interactive user access to the first application and the one or more second applications, and wherein the first application and the one or more second applications include at least one of an anti-virus application, a firewall application, a content filtering application, an anti-spam application, and a utilities application.

4. The computer program product of claim 3, wherein the common interface includes an application program interface.

5. The computer program product of claim 3, further comprising computer instructions to cause the programmable processing device to identify the first response in a first library utilizing the common interface.

6. The computer program product of claim 5, wherein the first library comprises a component of the first application.

7. The computer program product of claim 6, wherein the first library is installed with the first application.

8. The computer program product of claim 5, further comprising computer instructions to cause the programmable processing device to correlate the first response with the one or more second responses, the one or more second responses identified in a second library, the act of correlating utilizing logic of the common interface.

9. The computer program product of claim 8, wherein the second library comprises a component of the one or more second applications.

10. The computer program product of claim 9, wherein the second library is installed with the one or more second applications.

11. The computer program product of claim 1, further comprising computer instructions to cause the programmable processing device to identify at least one additional library associated with the additional application.

12. The computer program product of claim 11, wherein the logic of the common interface is configured to interface the additional application with the first application and the one or more second applications.

13. The computer program product of claim 3, wherein a first portion of the alert relates to the first application and a second portion of the alert relates to the one or more second applications.

14. A computer system interfacing a plurality of applications via a common interface, comprising:
    a first application configured to detect an event and generate a first response to the event, utilizing a processor of the system;
    an application program interface to a common interface in communication with the first application, the common interface for receiving a first signal from the first application, the first signal reflecting at least one of the event and the first response, the first response separate from the first signal, the common interface configured to allow cross-application communication between the first application and one or more second applications, the one or more second applications different from the first application; and
    one of the one or more second applications in communication with the application program interface to the common interface for being prompted with a prompt, the prompt initiated by the common interface responsive to the first signal, the prompt to request generation of a second response to the event by the second application;
    wherein the common interface receives a second signal indicating completion of the second response to the event and generates a single end user alert comprising information concerning the first response and the second response, and
    wherein the single end user alert contains information received at the common interface from both the first application and at least one of the one or more second applications,
    wherein the common interface further includes a graphical user interface for allowing interactive user access to the first application and the one or more second applications, and
    wherein the first application and the one or more second applications include at least one of an anti-virus application, a firewall application, a content filtering application, an anti-spam application, and a utilities application.

* * * * *

UNITED STATES PATENT AND TRADEMARK OFFICE
CERTIFICATE OF CORRECTION

PATENT NO.       : 8,732,835 B2                                    Page 1 of 1
APPLICATION NO.  : 11/855072
DATED            : May 20, 2014
INVENTOR(S)      : Bryson P. Gordon et al.

It is certified that error appears in the above-identified patent and that said Letters Patent is hereby corrected as shown below:

On the title page, item (57), in column 2, in "Abstract", line 2, delete "interlacing" and insert --interfacing-- therefor.

Signed and Sealed this
Fifth Day of August, 2014

Michelle K. Lee
*Deputy Director of the United States Patent and Trademark Office*